Figure 1:
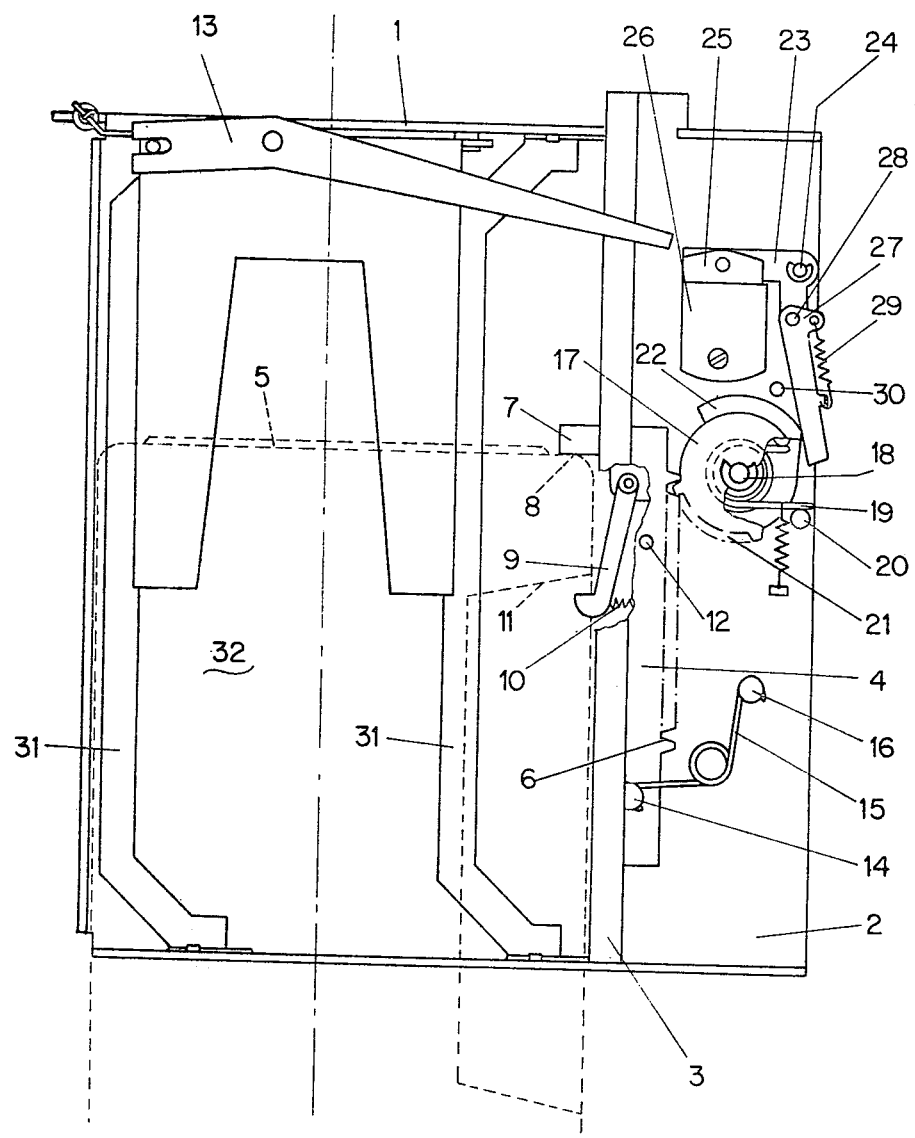

United States Patent [19]

Pera

[11] 4,259,701
[45] Mar. 31, 1981

[54] DEVICE FOR INSERTING AND EJECTING A CASSETTE IN A CASSETTE-TYPE TAPE RECORDER/PLAYBACK APPARATUS

[75] Inventor: Vittorio Pera, Rome, Italy

[73] Assignee: Autovox S.p.A., Rome, Italy

[21] Appl. No.: 50,576

[22] Filed: Jun. 21, 1979

[30] Foreign Application Priority Data

Jun. 30, 1978 [IT] Italy .................................. 50118 A/78

[51] Int. Cl.³ ...................... G11B 19/18; G11B 15/10; G11B 15/24
[52] U.S. Cl. ................................... 360/96.5; 242/198; 360/93; 360/105
[58] Field of Search ..................... 360/96.5, 96.1, 93, 360/90, 94, 137, 132; 242/197–200

[56] References Cited

U.S. PATENT DOCUMENTS

| | | | |
|---|---|---|---|
| 3,633,920 | 1/1972 | Ban | 360/93 |
| 3,779,482 | 12/1973 | Chimura | 360/96.1 |
| 3,860,964 | 1/1975 | Kozu et al. | 360/105 |
| 3,921,216 | 11/1975 | Wada | 360/93 |
| 4,087,844 | 5/1978 | Takahashi et al. | 360/105 |
| 4,099,213 | 7/1978 | Schatteman | 360/96.5 |

*Primary Examiner*—Alfred H. Eddleman
*Attorney, Agent, or Firm*—Ladas & Parry

[57] ABSTRACT

A device for inserting and ejecting a cassette in a tape recorder is disclosed which utilizes a sliding block for loading a torsion spring for ejection of the cassette in response to an electric control signal. The block has a rack-type toothed section for engagement with a toothed section of a drum during the movement of the block. Mechanical elements provide the loading, holding, and ejecting of the cassette in accordance with the control signal.

6 Claims, 2 Drawing Figures

DEVICE FOR INSERTING AND EJECTING A CASSETTE IN A CASSETTE-TYPE TAPE RECORDER/PLAYBACK APPARATUS

The present invention relates to a device for inserting and ejecting the magnetic tape cassette in a cassette-type tape recording/playback apparatus, particularly of the type apt to be installed in motor vehicles.

The main object of the present invention is to provide a device of the aforementioned type in which the operations of insertion and ejection of the cassette are simplified to the outmost and in particular the ejection of the cassette may be effected by means of an electric control signal or may even be rendered automatic by means of an electric control signal delivered by a sensor when the tape ends.

Another object of the present invention is obtaining the aforementioned results with a minimum of component parts, embodying a device which is compact and of reliable operation.

There are already well-known devices in which the introduction of the cassette automatically presets the apparatus in the playback or recording operation mode. A particular apparatus of this type is described, for example, in Italian Pat. No. 1 004 253. In the apparatus of Italian Pat. No. 1 004 253, however, the ejection of the cassette is mechanically obtained through an actuating push-button, onto which the user has to exert a manual pressure action.

In the device described in the above-mentioned patent, the introduction of the cassette causes the rotational displacement of a lever which presents two stable positions under the action of a bistable spring, the arrival at the end run of said rotatable lever causing the activation of a mechanism prestressed by a spring, which serves to lower the cassette by means of lowering means and to place the recording/playback magnetic head in its operative position. To effect the ejection of the cassette, a mechanical push-button control causes the movement of a sliding means which load a spring, the release of which is utilized partially for the ejection of the cassette and is partially saved to obtain the aforementioned preloading utilized during the lowering of the cassette.

Therefore, in the device described in Italian Pat. No. 1 004 253 for the ejection of the cassette is necessary a manual pushing for loading said spring.

On the other hand, the present invention utilizes, instead of a rotatable lever activated during the introduction of the cassette, a sliding block and, during the insertion of the cassette, there is loaded a torsion spring, the load of which is utilized, by effect of an electric control signal, for the ejection of the cassette.

More particularly, the device according to the invention comprises, on a support frame for the mechanism, a block slidable axially in the direction of insertion and of ejection of the cassette, which block has thereon a rack-type toothed section; a drum freely rotatable about a pivot pin fixed onto the frame, which drum has on its periphery a toothed section and a stop tooth; the toothed section is engaged with the rack portion during the sliding movement of the said block; a torsion spring is engaged with the said drum and is loaded during the sliding of the block at the moment of introduction of the cassette, which torsion spring releases, driving the drum and causing the sliding of the block in the direction of ejection; a holding mechanism electrically controlled by a holding relay comprising a hook apt to permit the rotation in a first direction of the said drum during the sliding movement of the block in the direction of insertion of the cassette to load said torsion spring and to block the rotation of the drum in the opposite direction while the said relay is in a energized condition, a de-energizing control signal for the relay causing the unblocking of the engagement between the hook and the tooth, so that the release of the torsion spring causes the rotation of the drum in the opposite direction, driving the sliding block in the direction of ejection of the cassette.

The holding mechanism is comprised in particular by a toggle system which comprises an elbow lever hinged onto the frame in correspondence of its elbow and hinged at one of its ends to the anchor of a holding relay and at the other end to said hook. The said hook has an end rotatably connected to the lever and may engage with its other step-shaped end the said stop tooth of the drum. A spring elastically urges the hook toward the position of engagement with said tooth, so that during the energized condition of the said holding relay, the hook is free to move angularly to permit the rotation of the drum in said first direction and is engaged by the stop tooth to block the rotation of the drum in the opposite direction, while in the de-energized condition of said relay, the elbow lever is displaced about its fixed pivot pin under the push of the hook urged by the action of said torsion spring, the hook being in turn displaced, rotating around its rotatable connection with said lever, toward a position which permits the rotation of the drum in said opposite direction.

Furthermore, during the introduction of the cassette, the sliding block activates a command lever for the lowering of the lowering means, so as to lower the cassette and bring it to its operative position.

Figure 2:
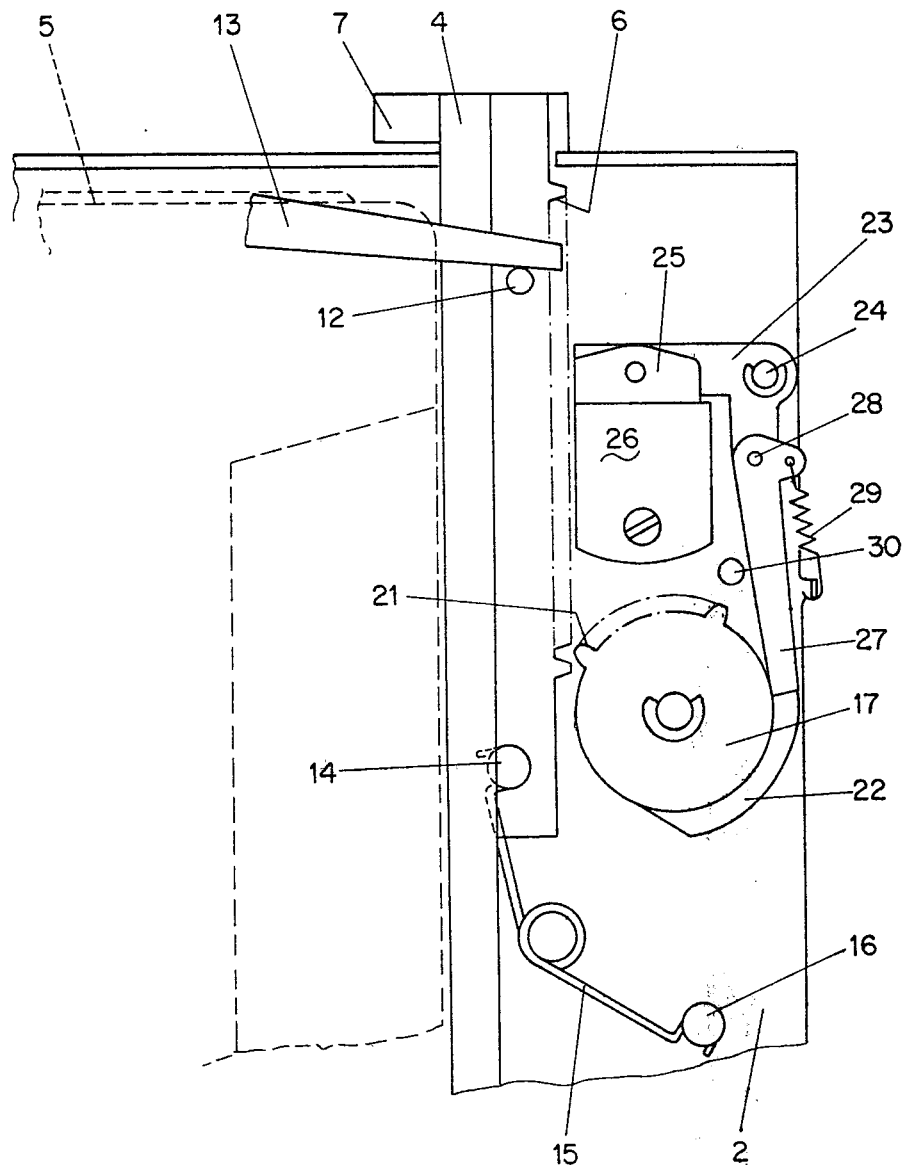

The present invention will be better illustrated with reference to the attached drawings, in which:

FIG. 1 shows the device in the initial position of insertion of the cassette or the final position of ejection of the said cassette, in which the torsion spring is not charged and the sliding block is in the first of its two stable positions; and FIG. 2 shows the device in the position of complete insertion of the cassette, in which the torsion spring is charged and the sliding block is in its second stable position.

Referring first to FIG. 1, a recording/playback apparatus is carried by a frame 1 which comprises a structural or "diaphragm" element 2 having a guide 3 along which a sliding block 4 may slide axially in the direction of insertion or ejection of the cassette 5, shown schematically with a dashed line.

The sliding block 4 has on its side a rack 6 and on its end a projection 7 against which rests the frontal wall 8 of the cassette 5 so that the block 4 may be slidingly engaged during the operation of introduction of the cassette 5.

The sliding block 4 has, on the side facing the cassette, a hook-type lever 9 preloaded by a spring 10, so as to hook the cassette 5 in its lateral opening 11. On its upper face, the sliding block 4 has a projection 12 which, during the insertion of the cassette 5 and the sliding movement of the block 4, engages a lever 13 which controls the lowering mechanism for the cassette (not forming part of the present invention). In addition, the sliding block 4 has thereon a stop 14 for the connection with a bistable spring 15 connected in turn to a pin 16 carried by the diaphragm 2, which spring 15 is apt to impart to the sliding block 4 two stable positions, that is, the inoperative position shown in FIG. 1 and the operative position shown in FIG. 2, which the sliding block assumes when the insertion of the cassette has been completed.

A drum 17 is idly mounted on a pin 18 fixed onto the structural element 2 and has thereon a torsionally loadable spring 19 having ends which both act on the drum 17 and which is provided with a suitable preliminary loading. In the unwound condition of said spring 19, no rotational moment is exerted onto the drum. However, due to the presence on the structural element 2, of a step 20 fixed in a suitable position, the following takes place: if said drum 17 effects a minor rotation in a clockwise direction (as viewed in FIG. 1), it brings one of the ends of spring 19 to lean against said fixed step 20, causing from that moment on, and in function of the described rotational angle, an ulterior loading of the torsion spring 19, as well as a reaction couple on the drum 17 with respect to the structural element 2, in a counterclockwise direction.

The drum 17 has, on one part of its periphery, a toothed section 21 apt to engage the rack toothed section 6 of the block 4 for a certain work angle which coincides with the path of introduction of the cassette, and to disengage at the end of said meshing engagement.

The drum 17 has additionally on its outer surface a stop tooth 22 which serves to prevent, when it is suitably engaged, the rotation of the drum 17 in a counterclockwise direction, as will be further explained in the description which follows.

Therefore, when the cassette 5 is pushed toward its seat, it drags the block 4 which, through the rack toothed section 6, causes the rotation of the drum 17 placing under stress the torsion spring 19, which is thus able, during its releasing operation, to drag the drum 17 and the block 4 in the direction opposite to the preceding one, i.e., in the direction of ejection of the cassette. There will now be described the mechanism for blocking in position the drum 17 with the spring 19 loaded, as well as its unblocking system.

An elbow lever 23 is articulated on a fulcrum 24 fixed onto the structural element 2 and is connected, at the end of one of its arms, to the contact anchor 25 of a holding relay 26. A hook 27 is articulated at the end of the other arm of the elbow lever 23, by means of a pin 28 and tends to engage the stop tooth 23 of the drum 17, because of the action of a traction spring 29 connected at one end to the structural element 2 and at the other end with said hook. The effect of the spring 29 is to urge the hook 27 to rotate in a clockwise direction, always keeping it near the drum 17, and in addition to impress at the same time to the elbow lever 23 a rotation in the counterclockwise direction, which thus tends to bring the anchor 25 into contact with the holding relay 26.

Therefore, during the rotation of the drum 17 in the clockwise direction, when the hook 27 engages the stop tooth 22 (see FIG. 2), the holding relay 26, in its energized condition, prevents the drum 17 from rotating in the counterclockwise direction, toward which the elbow lever 23 is urged by the load of the spring 19 of the drum 17.

On the structural element 2 there is carried a check pin 30, the function of which is to cause, when the holding relay is de-energized, the disengagement of the hook 27 from the stop tooth 22 of the drum 17, allowing the latter to rotate. In fact, because of the reversibility of the system determined by the position of the fulcrum 24 of the elbow lever 23, by the position of the pivot pin 28 and by the position of the point of engagement of the hook 27 with the tooth 22 of the drum 17, which do not lie on the same straight line, it so happens that, when the attraction force of the relay 26 is not present, the tangential force of the drum 17, which through the tooth 22 acts along the axis of the tooth 27, generates the contraction of the toggle formed by the arm of the elbow lever 23 and by the hook 27. At this point the hook 27 comes into contact with the check pin 30 and the hook 27 is urged to turn over around said check pin 30, disengaging its free end from the stop tooth 22 of the drum 17. At this point the drum 17 can continue its rotation in a counterclockwise direction, while the return spring 29 acts on the hook, bringing it back and causing the rotation of the elbow lever 23 in a direction as to bring the anchor 25, connected to it, into contact with the relay 26.

It is thus understood that the operation of the device is the following: when the cassette 5 is being inserted into the apparatus, it goes to rest on the plane composed by the lifters 31 and it comes in contact with the projection 7 of the block 4, thus causing its own hook-up with the hooked lever 9 hinged on said block, since this, pushed by its load spring 10, goes to engage the edge of the side opening 11. After, through the front wall 8 which pushes against the projection 7 of the slide 4, the cassette 5 drags the slide 4 forwardly, causing the charging of the bistable spring 15 and the rotation of the toothed drum 17, with which is engaged the block 4, as well as the resulting loading of the torsion spring 19.

In this phase of movement, by means of an opposite sensor (not shown) there is energized the holding relay 26 of the hook device.

The complete insertion run may be divided in two parts: a first part up to a dead point of the bistable spring 15 during which the movement takes place under the action of the manual push on the cassette 5; and a second part, after said dead point is superated, in which the movement of the block 4 and of the cassette 5 is caused by the push of the bistable spring 15.

In the first part of the run there is imparted to the bistable spring the load, which will be later utilized in the second part, and there is imparted to the torsion spring 19, lodged in the toothed drum 17, the load which will be later used in the ejection phase.

Said loading takes place up to a point suitably located downstream with respect to a dead point, in which the drum 17 is blocked by the hook 27, which prevents the rotation thereof. At the same time the teeth 21 of the drum 17 become disengaged from those of the rack of the block 4, leaving the latter free to continue in its run. Once the dead point is superated, the block is brought forwardly by the bistable spring 15 and the cassette 5 is pulled back by said block by means of a hook lever 9 hooked onto the side wall. In the latter part of said run, the cassette is released by the hook lever 9, which is forced to reenter into its lateral opening by a contour or cam (not shown) located on the side wall of the structural element 2, thus freeing itself from the engagement with the wall of the side opening 11 of the cassette, while the upper projection 12 of the block goes to load the end of the control lever 13 of a lowering device 32 of the cassette, the mechanism of which does not form part of the present invention.

The ejection of the cassette is determined by the de-energizing of the holding relay 26 of the hooking arrangement which blocks the drum 17. In fact, in the absence of the restraining action of said hooking device, the drum 17 may rotate under the action of the load of the torsion spring 19, giving back the energy stored during the phase of insertion. During such rotation, the toothed section 21 of the drum 17 returns in engagement with the rack 6 of the block 4, transmitting to it the axial component of the loading of the torsion spring 19 which, in turn, determines the raising of the lowering device 32. The cassette is thus free to move upwardly under the action of the raising devices 31. During the course of its run, the block 4 engages with its projection 7 the cassette 5 which has moved upwardly, driving it back in its return run.

Said run is effected up to a dead point of the bistable spring 15 under the urging of the torsion spring 19 of the drum 17.

Beyond said point, the bistable spring 15 serves to complete the run, causing the ejection of the cassette and the restoration of the system to its initial position, apt to receive the cassette for a new sequence.

It is thus understood that the operation of ejection of the cassette may be effected by means of an electric command which de-energizes the holding relay 26 and that such electric command may also be given automatically by a sensor which detects the end of the tape of the cassette.

While the invention has been illustrated in considerable detail in its particulars, it is understood that different variations and modifications may be made to the described embodiment, without thus departing from the scope of the present invention.

What is claimed is:

1. Device for inserting and ejecting the cassette in a cassette type tape recording/playback apparatus utilizing a tape cassette enclosed within a frame and characterized by the fact of comprising: a sliding block engageable through step means with the cassette and axially slidable in the direction of insertion and of ejection of the cassette, having thereon a rack toothed section; a drum, freely rotatable about a pivot pin fixed onto the frame, having thereon a toothed section and a stop tooth integral with its periphery, said toothed section being engaged with said rack section during the sliding movement of said block; a torsion spring engaged onto said drum, apt to be loaded during the sliding movement of the block in the direction of insertion of the cassette and which releases, driving the drum and causing the sliding movement of the block, in the direction of ejection; a holding mechanism electrically controlled by a holding relay, having thereon a hook apt to permit the rotation in a first direction of said drum during the movement of the block in the direction of insertion, to load said torsion spring, to block the rotation of the drum in the opposite direction, by means of said stop tooth, up to the point when the holding relay is in an energized condition, the de-energizing of the relay causing the unblocking of the engagement between the hook and the tooth, so that the unwinding of the torsion spring causes the rotation of the drum in the opposite direction, driving said block in the direction of ejection of the cassette.

2. Device according to claim 1, in which the holding mechanism is composed by a toggle system comprising: an elbow lever hinged on a fulcrum fixed onto the frame in correspondence of its elbow and hinged at one end to the anchor of said holding relay and at its other end with an end of said hook by means of a rotatable connection, the other end of said hook being engageable, by step means, with said stop tooth of the drum; a spring which elastically urges the hook toward the position of engagement with said tooth so that, in the energized position of said holding relay, the hook is free to move angularly around its rotatable connection with said lever, to permit the rotation of the drum in said first direction, a rotation of the drum in the opposite direction being prevented by the engagement of said hook with said stop tooth, while in the de-energized of said relay, said elbow lever is displaced about its fixed pivot pin under the push of the hook urged by the action of the torsion spring of the drum, said hook, in turn, rotationally moving around its rotatable connection with said lever, toward a position which permits the rotation of the drum in said opposite direction.

3. Device according to claim 1, in which said sliding block is urged toward the initial position and the final position of its run by a bistable spring.

4. Device according to claim 1, in which a check pin integral with the frame permits a turning over of the hook in its moving around its rotatable connection with said lever, under the push of the tooth of the drum, to permit the rotation of the drum in said opposite direction.

5. Device according to claim 1, in which said block, during its run in the direction of insertion of the cassette, displaces by step means a lever which activates a lowering device for the cassette.

6. Device according to claim 1, in which a hook lever apt to become engaged in the anterior opening of the cassette is carried by a pin integral with said block and is urged by a spring toward the engagement with said opening, said hook lever being moved away from the engagement position with said opening by contact with a cam integral with the frame, before that the block activates said lever of the lowering device.

* * * * *